United States Patent [19]

Demarais

[11] Patent Number: 5,121,410
[45] Date of Patent: Jun. 9, 1992

[54] METHOD FOR THE TRANSMISSION OF DATA OR COMMANDS AND DEVICE FOR CARRYING OUT SAID METHOD

[75] Inventor: Gérard Demarais, Soisy-Sous-Montmorency, France

[73] Assignee: Faiveley Transport, Saint-Ouen Cedex, France

[21] Appl. No.: 471,521

[22] Filed: Jan. 29, 1990

[30] Foreign Application Priority Data

Feb. 1, 1989 [FR] France .................. 89 01272

[51] Int. Cl.⁵ .......................................... H04L 25/20
[52] U.S. Cl. ........................... 375/3; 178/71 R; 178/71 T; 246/166.1; 246/167 R
[58] Field of Search ........... 178/71 R, 71 N, 71 T; 370/55, 75, 97, 26; 375/3, 4; 246/1 R, 7, 166.1, 167, 192, 193, 218, 246; 340/825.16, 531, 534, 545

[56] References Cited

U.S. PATENT DOCUMENTS

| 2,947,816 | 8/1960 | Hysko | 178/71 R |
|---|---|---|---|
| 3,040,130 | 6/1962 | Hughes | 178/71 R |
| 3,234,541 | 2/1966 | Paull | 340/545 |
| 3,757,301 | 9/1973 | Regan et al. | 340/545 |
| 4,154,978 | 5/1979 | Tu | 178/71 R |
| 4,574,373 | 3/1986 | Ahola | 370/55 |
| 4,577,327 | 3/1986 | Nambu | 178/71 R |
| 4,872,183 | 10/1989 | Egami | 178/71 R |

FOREIGN PATENT DOCUMENTS

0025483  3/1981  European Pat. Off. .
60-152153 8/1985 Japan .

Primary Examiner—Benedict V. Safourek
Attorney, Agent, or Firm—Young & Thompson

[57] ABSTRACT

The method for the transmission of data or commands, in alternating duplex mode between a first port (2) connected to a first of transmission lines, and a second port (3) connected to a second pair of transmission lines, comprises: a step (A) of detection and processing of data at the input of either of the said ports, then designated as the input port, the other port being designated as the output port, followed by a step (B) of blocking any transmission of possible signals coming from the output port towards the input port, a step (C) of transmission of the said data from the input port to the output port when data are detected at the input of the input port, and in the opposite case followed by a step (D) of blocking the transmission of all possible signals from the input port to the output port, leding to step (A) again. The data presented to any of the said ports are in the form of an amplitude modulation of an alternating carrier signal having a predetermined carrier frequency, and the step (A) of detection and processing comprises a step of identification of the predetermined carrier frequency and a step of extraction of a useful signal representative of the said data to be transmitted.

14 Claims, 5 Drawing Sheets

FIG_1

FIG_2

FIG_3

METHOD FOR THE TRANSMISSION OF DATA OR COMMANDS AND DEVICE FOR CARRYING OUT SAID METHOD

The present invention relates to a method for the transmission of data or commands in alternating duplex mode. It also relates to a device for the transmission of data in alternating duplex mode implementing this method and its application to the transmission of opening data and closing commands for the doors of a string of railroad cars.

In a string of railroad cars, commands for opening the doors and closing data for the latter must be transmitted from car to car to the driving controls by means of pairs of transmission lines while guaranteeing maximum safety for the passengers. It is particularly a matter of preventing any untimely opening of the doors of a car while the train is moving.

Systems for the transmission of opening and closing commands for the doors are already known in which safety is based on the principle of redundancy, using electromechanical relays and, for the transmission of a signal, using at least two pairs of transmission lines Even though the techniques aimed at preventing any untimely opening of the doors have been highly developed, the use of electromechanical relays can lead to the transmission of incorrect data. In the particular case of controlling the closing of the doors of a car fitted with eight doors each having two leaves, these transmission systems comprise a recapitulation relay, which is of high cost, which controls the 16 contacts, connected in series, for the closure of the sixteen leaves of the car in question. If one of the contacts has an accidental short-circuit, the train can leave even though one door is open or incorrectly closed, this representing a risk for the passengers.

Transmission systems are also known which use telephonic transponders But these do not allow local branching, are not suitable in size, cost and ruggedness to railroad applications and have a limited passband which does not allow the transmission of the normal signals used in railroad equipment Furthermore, they have no intrinsic safety and the low power level, in the order of 1 mW, makes the transmission lines fitted with these transponders very prone to interference, because of their voltage and current levels which are incompatible with the normal railroad environment, for which a transmission power level in the order of 2 W is recommended.

Bidirectional receiver circuits are known which can transmit digital signals in both directions in which a control signal can temporarily inhibit the transmission in the opposite direction. Such circuits are described in the documents U.S. Pat. No. 4,154,978, U.S. Pat. No. 4,577,327 and EP-A-0025483. A satisfactory transmission security is obtained in this way. However, this security is possible with these systems only for digital signals and this limits their usefulness to a certain number of applications.

In the particular case of the transmission of data and commands for the doors of railroad cars, modulated analog signals are used which therefore involve an energy, this transmission of energy providing the maximum security as the absence of this energy is interpreted directly as an absence of a command or of data. The prior art does not therefore resolve the problem of the security of transmission of these analog signals with the maximum efficiency, The object of the invention is to overcome these disadvantages by proposing a method for the transmission of data or commands in alternating duplex mode between a first port connected to a first pair of transmission lines and a second port connected to a second pair of transmission lines.

The invention thus proposes a transmission method comprising:

A) a step of detection and processing of data at the input of either of the said ports, then designated as the input port, the other port being designated as the output port, followed B) by a step of blocking any transmission of possible signals coming from the output port towards the input port, C) a step of transmission of the said data from the input port to the output port when data are detected at the input of the input port, and in the opposite case followed, D) by a step of blocking the transmission of all input signals to the output port, leading to step A) again.

According to the invention, this transmission method is characterized in that the data presented to any of the said ports are in the form of an amplitude modulation of an alternating carrier signal having a predetermined carrier frequency, and in that the step A) of detection and processing comprises a step of identification of the predetermined carrier frequency and a step of extraction of a useful signal representative of the said data to be transmitted.

A transmission method is thus available which, because of the step of blocking transmission in the non selected direction and of the step of opening a transmission path in the selected direction, provides a high level of transmission security In fact, any untimely transmission in the non-selected direction is thus prohibited. The locking of the transmission is maintained until the carrier signal at the input of the port in question disappears. The method is designed for the transmission of analog signals, which makes it advantageous for numerous applications like the transmission of data and commands for the doors of railroad cars.

According to a particular embodiment of the invention, the useful signal is a logic signal, the carrier signal being modulated such that for each value 0 or 1 of the logic signal there corresponds a predetermined amplitude level of the carrier signal and the transmission step D) is controlled by the result of a predetermined logic operation on at least one predetermined external logic variable.

It is thus possible locally to control the transmission of data from one port to the other port and thus to take into account the transmitted data.

According to another embodiment of the invention, the said steps A) to D) are selectively inhibited by the possible use of predetermined local control means and then replaced by the following steps:

E) a step of selection of one of the said first and second ports or of both of them together, as output ports, followed F) by a step of transmission of a predetermined datum by the said selected ports, selectively interrupted by external action on means of interruption, and then followed G) by a step of selective blocking of any transmission to the said selected port or ports whose blocking has been requested, leading to a new step E) if the said local control means are still actuated, or indeed to the said step A in the opposite case.

With this embodiment of the method of the invention, an operator can locally intervene in order to transmit a command or a datum selectively at will from one or other of the said first and second ports, while taking advantage of the steps of transmission path blocking and opening.

According to another aspect of the invention, the device for the transmission of data in alternating duplex mode between a first port and a second port using the method of the invention, comprises means for detecting and processing data at the input of either of the said ports, then designated as the input port, the other port being designated as the output port, means of selectively blocking any transmission of possible signals coming from the output port towards the input port, connected to the means of detection and processing, means of selectively opening a predetermined transmission path from the said input port to the said output port, connected to the said means of blocking, means for transmitting the said data to the said output port, connected on the one hand to the said means of extraction and to the said means of opening and on the other hand to the said output port, the said means of detection and extraction working in conjunction with the said means of selective blocking and opening in order to authorize at any time only one direction of transmission between the said first and second ports. The means of detection and processing then comprise means of identification of a predetermined carrier frequency and means of extracting from an alternating signal at the said predetermined carrier frequency at the input of the input port, a useful modulation signal representative of the data to be transmitted, each of the said ports being connected to a pair of transmission lines.

Thus, the transmission device according to the invention enables the definition of a privileged transmission path for a datum or a command from one port to the other with a high level of security since no untimely signal can gain access to the means of transmission, because of the two functional barriers created on the one hand by the means of selective blocking and on the other hand by the means of selective opening. There is thus obtained a unidirectional relaying of appropriate data or commands transmitted with a regeneration of carrier signals by means of the transmission means.

According to an advantageous embodiment of the invention, the transmission device has a symmetrical disposition of the said abovementioned means with respect to the said first and second ports, the said above mentioned means being distributed as two, first and second, groups of identical means respectively attached to the said first and second ports and respectively comprising first and second means of detection respectively connected to the said first and second ports, first and second means of extraction respectively connected to the said first and second means of detection, first and second means of selectively- blocking data coming from the opposite port, first and second means for selectively opening a transmission path connected, on the one hand, respectively to the said first and second means of extraction and, on the other hand, respectively to the said first and second means of selective blocking, and first and second means for transmitting data coming from the opposite port, connected on the one hand respectively to the said first and second means of blocking and, on the other hand, respectively to the said first and second ports, the said first and second means of selective opening of the said first and second groups being respectively connected to the said second and first means of selective blocking of the said second and first groups and to the said second and first means of selective opening of the said second and first groups.

The totally symmetrical structure of the device according to the invention provides a perfect bidirectional character to the transmitter thus obtained and guarantees good functioning in alternating duplex mode. Furthermore, the specific connections of the first and second means of selective opening with the second and first means of selective blocking result in a flip-flop type arrangement which precisely enables the setting-up of a privileged transmission path in the direction of the transmission in progress.

According to a first preferred embodiment of the invention, the transmission device furthermore comprises means for controlling the transmission of data from the input port to the output port via the means of opening and the means of blocking, as a function of the state of at least one predetermined external variable supplied as an input to the said means of control.

It is thus possible to control the transmission of data as a function of local data and to take into account a situation which is specific to the installation site of the device according to the invention.

According to a second preferred embodiment of the invention, the transmission device furthermore comprises local control means, respectively connected to the said first and second means of selective opening and to the said first and second means of selective blocking, for selectively transmitting a predetermined datum to at least one of the said ports, while simultaneously inhibiting any transmission of data from one of the said ports to the other port, first and second means of line control, connected on the one hand respectively to the said first and second means of selective opening, synchronized with the said means of local control, first and second means of port selection, connected on the one hand to the said means of local control, and on the other hand, respectively to the said first and second means of selective blocking and to the said first and second means of selective opening, and first and second means of interruption, connected, on the one hand, respectively to the said first and second means of line control and, on the other hand, to the said first and second means of selective blocking.

This preferred embodiment of the invention enables an operator to act directly from the transmission device in order to transmit a datum from one of the said ports.

The operator selects the transmission port by action on the means of port selection concerned and can interrupt the transmission at any time by action on the corresponding means of interruption.

According to yet another aspect of the invention, the system for the transmission of data or commands in a railroad train constituted from several cars, implementing transmission devices according to the invention, comprising in each car a first pair of transmission lines, for transmitting step by step a first opening command for a first group of doors (in the car)

a second pair of transmission lines for transmitting, step by step, a second opening command for a second group of doors, a third pair of transmission lines, for transmitting, step by step, a closing datum of doors of cars in the train situated in a predetermined direction with respect to the said car, furthermore comprises, first and second transmission devices according to the second preferred embodiment of the invention, whose said first ports are respectively connected on the one hand to a first end of the said first pair of lines and to a first end of the said second pair of lines and, on the other hand, to door opening means associated with each door respectively belonging to the said first and second groups of doors, and whose said second ports are respectively connected to second ends of the first and second pairs of transmission lines of the car adjacent to the said car, on the side of the said second ports, the said predetermined external variables controlling the said transmission of data comprising a first variable indicative of the closing of the doors of the said first group of doors and a second variable indicative of the closing of the doors of the second group of doors, and being supplied to the said control means respectively by a first group and by a second group of door closing sensors connected in series.

The use of transmission devices according to the invention within a system for the transmission of data or waves thus enables, on the one hand, the use of electromechanical devices or telephonic transponders to be avoided and, on the other hand, the availability of local control means in each car.

As the transmission devices used are totally symmetrical and bidirectional, the transmission system according to the invention can easily be reconfigured as a function of the composition of the train and no matter what the relative position of the driving controls with respect to each car may be.

Other features and advantages will become apparent in the following description.

In the appended drawings, given by way of non-limitative examples.

Figure 1:
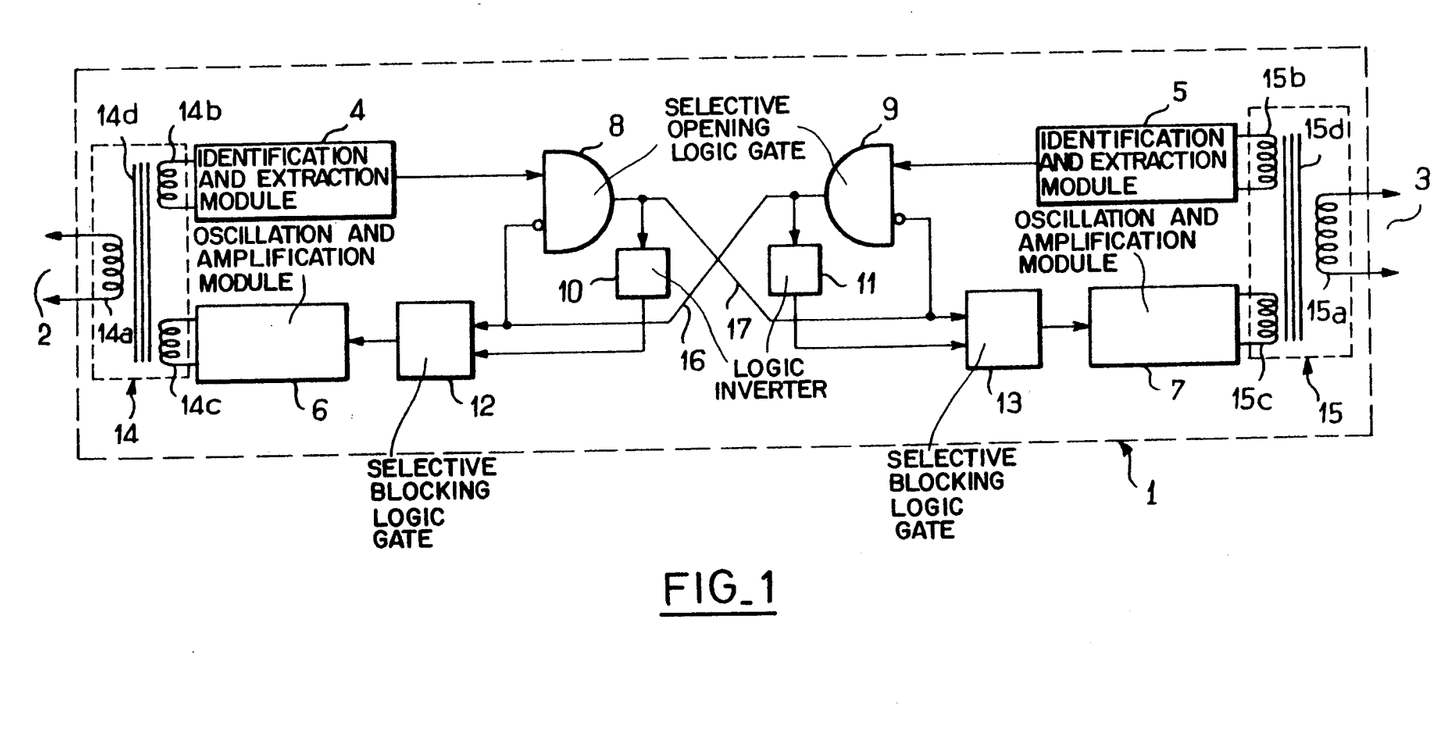
FIG. 1 is a block diagram of the symmetrical transmission device according to the invention.

The basic principle of the device for the transmission of data or commands according to the invention is illustrated in the block diagram of FIG. 1.

The transmission device 1 has a symmetrical structure. Its two ports 2, 3 must be capable of being used either as inputs or as outputs. They can for example be connected to transmission lines or can be directly connected to a transmitter or to a receiver device. The function of the transmission device is to provide the regeneration of the transmitted signals and possibly the modification of these signals as a function of local commands.

Each of them is connected to a primary winding 14a, 14b of a transformer 14, 15 comprising a magnetic circuit 14d, 15d and to secondary windings 14b 14c; 15b, 15c.

For each transformer, a secondary winding 14b, 15b is connected to the input of a signal detection and extraction module 4, 5, while the other secondary winding 14c, 15c, is connected to the output of an oscillation and amplification module 6, 7.

The core of the device according to the invention is constituted by a flip-flop comprising two selective opening logic AND gates 8, 9, each having two inputs of which one is inverted, looped together according to the known technique of sequential flip-flops.

A first input of each of the opening logic gate 8, 9 is connected to the respective output of each identification and extraction module 4, 5, while the other inverted input is connected on the one hand to the output of the opposite selective opening logic gate 9, 8, on the other hand, to a first input of a selective blocking two input logic AND gate 12, 13, by the links 16 and 17 respectively. The output of each selective opening logic gate 8, 9 is respectively connected on the one hand to the second input of each selective blocking logic gate 12, 13, via logic inverters 10, 11, and on the other hand to the second input of the opposite selective opening logic gate 9, 8. These logic gates 8, 9 can be manufactured using the known technique, called flat transfer, using components for CMS surface mounting, also used in hybrid technology.

The data or commands transmitted on pairs of lines connected to the ports 2, 3 of the device according to the invention are in practice alternating signals having a frequency within the band 15 kHz to 30 kHz, by way of example, and amplitude modulated by control or data signals.

An essential function of the transformers 14, 15 of the device 1 according to the invention coupled to the identification and extraction modules 4, 5 is to provide the loopback of the lines connected to the port, to provide the required impedance matching and to allow the pair of lines between two devices according to the invention to be floating, the transformers providing the coupling between the successive pairs of lines.

The general principle of operation of the device for the transmission of data or commands in alternating duplex mode will now be explained, this explanation at the same time illustrating the method according to the invention with reference to FIG. 1.

Assume that a data-carrying signal appears on the port 2. The transformer 14 will, by magnetic coupling, present an electrical image of the signal at the terminals of its secondary winding 14b, and also at the terminals of its other secondary winding 14c.

The signal detection and extraction module 4, connected to the input of the secondary winding 14b, will identify the predetermined carrier frequency, extract the useful carrier signal and shape it. It is possible to consider, by way of example, the case of a logic command represented by a logic 1 level associated with a predetermined high amplitude. The identification and extraction module thus delivers on output a logic 1 signal which is applied to the flip-flop constituted by the two logic gates 8, 9.

The initial conditions of the flip-flop are as follows:
respective first inputs of the logic gates 8, 9: 0
second inputs before inversion: 0
outputs : 0

After application of the logic 1 level to the first input of the logic gate 8, the output of the latter switches from the initial logic 0 level to the logic 1 level. This results, on the one hand, in the application of a logic 1 level to a first input of the second selective blocking logic gate 13, whose second input was initially also at the logic level and, on the other hand, in the application of a logic 0 level to a second input of the first selective blocking gate 12, via the logic inverter 10, the first input of the first selective blocking gate 12 then at the output logic 0 level while the second selective blocking gate has an output logic 1 level. Thus all access to the first oscillation and amplification module 6 is temporarily prohibited: there is blocking of transmission from the port 3 to the port 2. Furthermore, the logic output level 1 of the logic gate 8 is also applied to the inverted input of the second selective opening logic gate 9.

This results in a logic 0 level at the output of the logic gate 9, which was already present initially. But now the logic 0 level is imposed by the opposite logic gate 8 and not by the absence of an output signal from the second identification and extraction module 5.

The logic 0 level is applied, on the one hand, to the inverted input of the first selective opening logic gate 8, to the first input of the first selective blocking logic gate 12 and, on the other hand, as an input of the second logic inverter 11 which then presents a logic 1 level to the second input of the second selective blocking logic gate 13.

Consequently, a transmission path has been opened: port 2→winding 14a→winding 14b→logic gate 8→logic gate 9→oscillation and amplification module 7→winding 15c→winding 15a→port 3
while any transmission in the other direction is blocked because of the following logic gates:
second selective opening logic gate 9
first selective blocking logic gate 12.

If, for any reason whatever, a carrier signal appears at the input of the gate 3 and is identified and processed by the second identification and extraction module 5 which then delivers a logic 1 signal to the first input of the second selective opening logic gate 1, the latter will maintain the transmission blockage as long as the legal transmission from the port 2 to the port 3 is in progress.

Then, the second selective blocking logic gate 13 transmits a logic 1 level to the module 7 which provides, on the one hand, the conversion of the logic 1 level to an alternating carrier signal (oscillation) and, on the other hand, the amplification of this signal before transfer to the port 3 via the second coupling transformer 15.

This provides a high security level in the device according to the invention. Furthermore, if the second selective opening logic gate 9 fails and incorrectly transmits a logic 1 level, the first selective blocking logic gate 12 provides a final barrier to the transmission of the incorrect data to the port 2, as long as the transmission from the port 2 to the port 3 is not completed.

The explanation which has just been given is of course also valid for the other direction of transmission, the device according to the invention being entirely symmetrical.

In another embodiment, the transmission of a command or a datum from one port to the other can be controlled by control means which respond to the state of at least one external variable.

Figure 2:
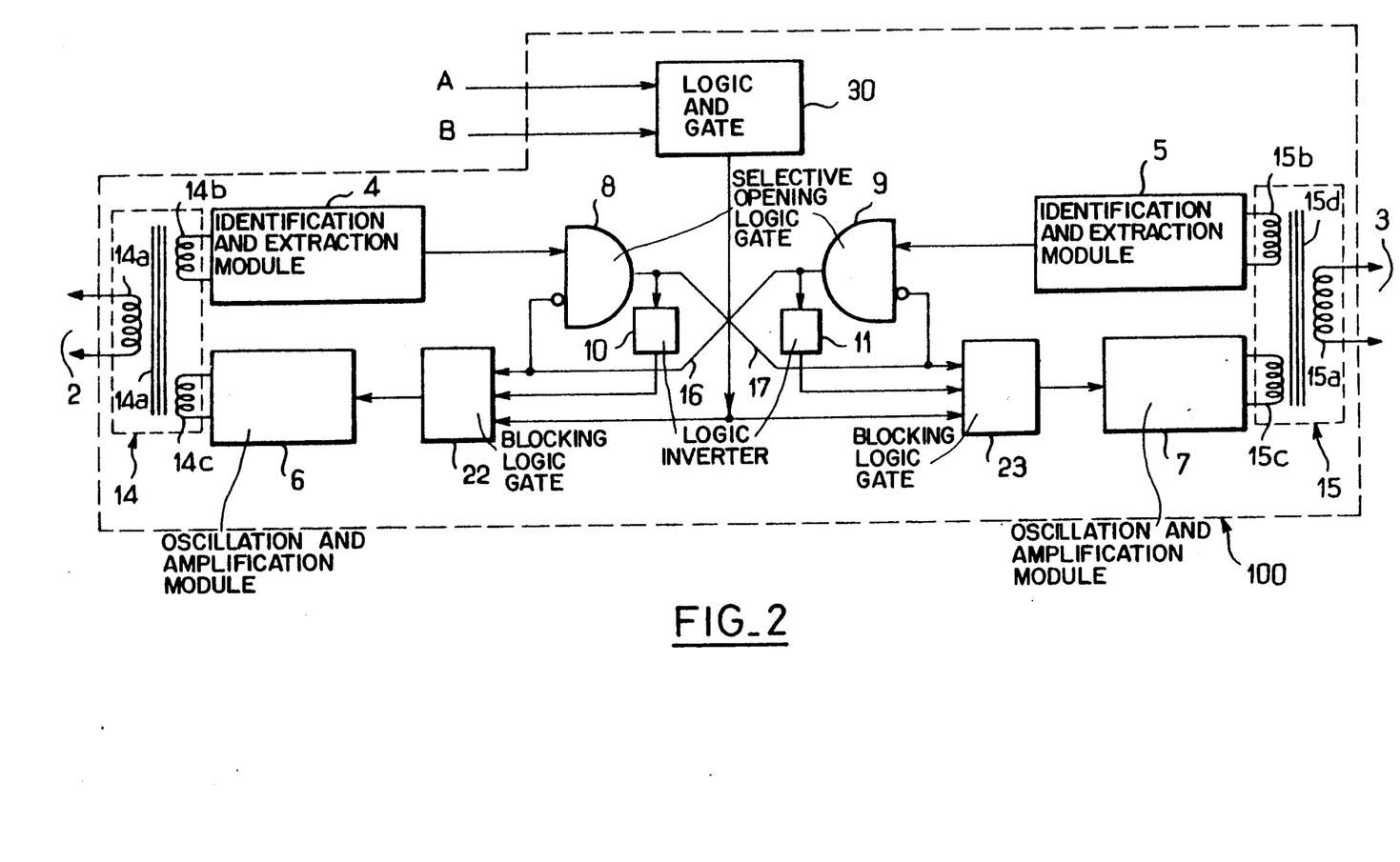
FIG. 2 is a block diagram of a particular embodiment of the device according to the invention in which external variables are taken into account.

FIG. 2 shows this embodiment in which two logic variables A, B, external to the device 100 according to the invention, are applied to a logic AND gate 30 whose output is connected respectively to a third input of first and second selective blocking logic gates 22, 23. The rest of the device 100 is identical to the device 1 described above.

The logic control gate 30 enables the blocking of a transmission in progress in one direction or the other if at least one of the two logic variables A. B exhibits a logic 0 level. Thus, if a signal equivalent to a logic 1 level is present at the port 2, the non-satisfaction of the condition A, B = 1, results in the transmission of a signal equivalent to a logic 0 level to the gate 3. The same applies in the case of transmission from the port 3 to the port 2.

Figure 3:
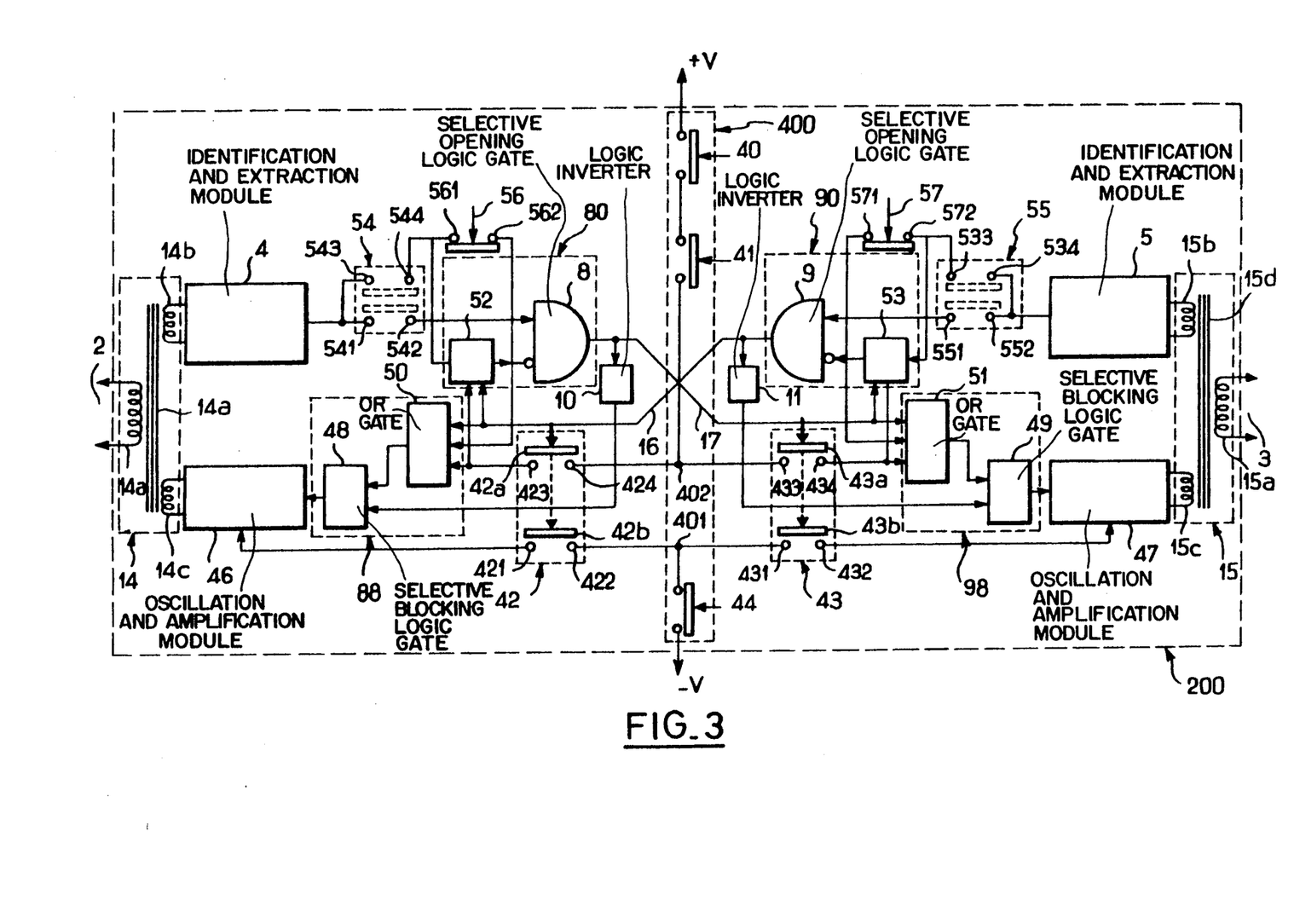
FIG. 3 is a block diagram of another embodiment of the device according to the invention enabling the taking into account of local commands.

Another advantageous version of the device according to the invention is shown in FIG. 3.

This version of the invention was designed to allow a local intervention by an operator in the transmitted commands whatever the direction of transmission may be.

The elements of the device with local control 200 which are common to the first device according to the invention shown in FIG. 1 are:
the ports 2, 3
the coupling transformers 14, 15
the first and second selective opening logic gates 8, 9
the identification and extraction modules 4, 5.

In this version of the invention, while initially restricting the description of the device 200 to the first left-hand section for reasons of symmetry, the output of the identification and extraction module 4 is connected to a first line control switch 54 comprising four poles 541, 542, 543, 544 and having two stable states:
a first state, in which the poles 541 and 542 are electrically connected and the two poles 543 and 544 are in open circuit,
a second state, in which the poles 543 and 544 are electrically connected and the two poles 541 and 542 are in open circuit.

The two first and third poles 541 and 543 are interconnected and connected to the output of the module 4.

The second pole 542 of the switch 54 is connected to the first input of the first selective opening logic AND gate 8, while the fourth pole 544 is connected, on the one hand, to a first pole 561 of a first interruption switch 56 and, on the other hand, to a first input of a first control logic two-input OR gate 52. The second pole 562 of the first interruption switch 56 is connected to a second input of a first selection three-input logic OR gate 50.

The first control logic OR gate 52 has a second input connected, on the one hand. to a third input of the first selection logic OR gate 50 and, on the other hand, to a third pole 423 of a first 4-pole port selection switch 42, and a third input connected, on the one hand, to a first input of the selection logic OR gate 50 and, on the other hand, to the output of the second selective opening logic gate 9. The output of the first control logic OR gate 52 is connected to the second inverting input of the first selective opening logic gate 8.

The first control logic OR gate has its output connected to a first input of a first selective blocking logic two-input AND gate 48 whose output is connected to the input of the first oscillation and amplification module 46, and whose second input is connected to the output of the first selective opening logic AND gate 8 via a logic inverter 10.

The first port selection switch 42 has four poles 421, 422, 423, 424 and two possible stable states:

in the first state, the first and second poles 25 421, 422, on the one hand, and the third and fourth poles 423, 424, on the other hand, are in electrical contact;

in the second state, all electrical contact is eliminated.

The first pole 421 of the first port selection switch 42 is connected to the first oscillation and amplification module 46. The second pole 422 is connected, on the one hand, to a first pole of a bipolar local control switch 44 and, on the other hand, to the first pole of the second, opposite and symmetrical, port selection switch 43. The fourth pole 424 of the first port selection switch 42 is connected, on the one hand, to a second pole of a first bipolar local control switch 41, and, on the other hand, to the third pole of the second, opposite and symmetrical, port selection switch 43.

The combination of the control logic OR gate 52 and the selective opening logic AND gate 8 constitutes the new means of selective opening 80 of the device 200 according to this version of the invention. Furthermore, a combination of the selective logic OR gate 50 and the selective blocking logic gate 48 constitutes the new selective blocking means 88.

The local control means 400 of the device 200 according to this version of the invention comprise a bipolar displacement switch 40 of which a first pole is connected to a d.c. voltage source of positive polarity +V, the first local control switch 41 of which a first pole is connected to the second pole of the displacement switch 40 and of which a second pole is respectively connected to the fourth and third poles 424, 433 of the first and second port selection switches 42, 43, the second local control switch 44, of which a first pole is respectively connected to the second and first poles 422, 431 of the first and second port selection switches 42, 43 and of which a second pole is connected to a d.c. voltage source of negative polarity −V.

The second line control means (55; 551, 552, 553, 554), the second means of interruption (57, 571, 572), the second means of selective opening (90; 9, 53), the second means of port selection (43; 431, 432, 433, 434), the second means of selective blocking (98; 51, 49) and the second oscillation and amplification modules 5 are arranged exactly in the same way as that described for the first group of means, because of the symmetry of the device according to the invention.

Furthermore, the first and second line control switches 54, 55, have a perfectly synchronous operation. Thus, when the first and second poles 541, 542 of the first line control switch 54 are in electrical contact, the first and second poles 551, 552 of the second local control switch 41, 44 are also in synchronism with the first and second line control switches 54, 55. Thus, the first and second local control switches 41, 44 are in the closed position when the first and second line control switches 54, 55 are in the "high" position, namely when, on the one hand, the third and fourth poles 543, 544 of the first line control switch 54 and, on the other hand, the third and fourth poles 553, 554 of the second line control switch 55 are in electrical contact.

In practical terms, the first and second line control switches 54, 55 and the first and second local control switches 41, 44 are mechanically integral and are therefore operated simultaneously. For reasons of clarity of the description, the overall switch, including the line control switches 54, 55 and the local control switches will be denoted in the rest of the description by the reference CCL or local control switch. A description will now be given of the principle of operation of the device 200 according to the preferred version of the invention which has just been described.

Two operating modes are distinguished according to the position of the local control switch CCL.

Mode a)

the switch CCL is in the open position: the first and second line control switches 54, 55 are in the "low" contacts position, namely, the respective pairs of poles 541, 542 and 551, 552 of the first and second line control switches 54, 55 are in electrical contact; the first and second local control switches 41, 44 are in open circuit.

Mode b)

the switch CCL is in the closed position: the first and second line control switches 54, 55 are in the "high" contacts position, namely the respective pairs of poles, 543, 544 and 553, 554 of the first and second line control switches 54, 55. The first and second local control switches 41, 44 are in the closed position.

The mode a) is equivalent to the operational mode previously described with reference to FIG. 1. In fact, in this mode, the outputs of the first and second detection and extraction modules 4, 5 are respectively connected to the first inputs of the first and second selective opening logic gates 8, 9. Furthermore, the first and second port switches 42, 43 are inoperative whatever their state may be because the two first and second local control switches 41, 44 are in the open position. Furthermore, the first and second interruption switches 56, 57 are also inoperative because the fourth poles of the first and second line control switches 54, 57 are not connected to the third poles of the said line control switches 54, 57. Therefore, the first and second selection logic OR gates, 50, 51 have a simple follower gate function The same applies to the first and second control logic OR gates 52, 53. There is therefore again found the electrical circuit equivalent to that of the device 1 according to a first embodiment of the invention and, of course, an equivalent principle of operation.

In mode b) (switch CCL in the closed position), several situations can also be envisaged.

Firstly, if the displacement switch 40 is open, the transmission device is blocked in both transmission directions. In the particular case of the application of such a device to a system for the transmission of door opening commands in a string of railroad cars, the displacement switch 40 is in the open position when the train is moving, which has the effect of preventing any untimely door opening command.

If the displacement switch 40 is in the closed position, the local operator, for example a train driver, can operate either one of the two port selection switches 42, 43 or both together, for the purpose of transmitting a command either to the other transmission devices on the side of the port 2, or to the other transmission devices on the side of the port 3, or on either side of the transmission device 200 from which the local control is carried out.

By way of non-limitative example, consider the hypothesis of a local control for devices connected to the port 2. This control is carried out by operating the first port selection switch 42. The closing of this switch has the effect of subjecting the third input of the first logic OR selection gate 50 to a logic 1 level, if it is accepted that the potential difference between the d.c. voltage source +V and the d.c. voltage source −V corresponds exactly to a logic level in the electrical context of the device 200 being studied here. The closing of the third and fourth poles 423, 423 places the said third input at the potential +V, and the closing of the first and second poles 421, 422 places the oscillation and amplification modules 46 and therefore the selective blocking 48 and selection 50 logic gates, which are directly and indirectly connected, at a low reference voltage level equal to the value of the d.c. voltage −V.

Now, the first input of the first selection switch 50 is initially at a logic 0 level, if it is assumed that at this instant no carrier signal is detected on the second port 3.

Furthermore, the second input of the first selection switch 50 is also at logic 0 level because of the putting out of circuit of the fourth pole 544 of the first line control switch 54.

The selection logic OR gate 50 therefore has at the output a logic 1 level which is applied to the first input of the first selective blocking logic AND gate 48 whose second input is connected to the output of the first selective opening logic gate 8 via the logic inverter 10. Now, the output of the logic gate 8 is initially at the logic 0 level (no transmission in progress).

Therefore, the two inputs of the selective blocking logic AND gate 48 both being at the logic 1 level, an output logic 1 level is applied to the first oscillation and amplification module 46, which definitively operates to send a command to the port 2, via the coupling transformer 14.

The presence of a carrier signal on the port 2 is immediately detected by the first detection and extraction module 4 which then transmits a logic 1 level to the input of the first line control switch 54. This logic 1 level is transmitted to the second input of the first selection logic OR gate 50, via the poles 543, 544 in electrical contact and the poles 561, 562 which are also in electrical contact. This has the effect of providing a self-maintaining of the transmission of the command to the port 2, and of enabling the port selection switch 42 to be released. The self-maintaining is interrupted by an action on the first interruption switch 56, which has the effect of taking the second input of the first selection logic OR gate 50 to a 0 level and of consequently eliminating any transmission of a carrier signal from the port 2.

The operating principle of a local control to the port 2 which has just been given can obviously easily be transposed to a local control to the port 3 by the second port selection switch 43.

Furthermore, the two local controls can be made simultaneous by the joint operation of the two port selection switches 42, 43.

A preferred application of the devices according to the invention relates to the transmission of door closing data and door opening commands for the cars of a railroad train.

Figure 4:
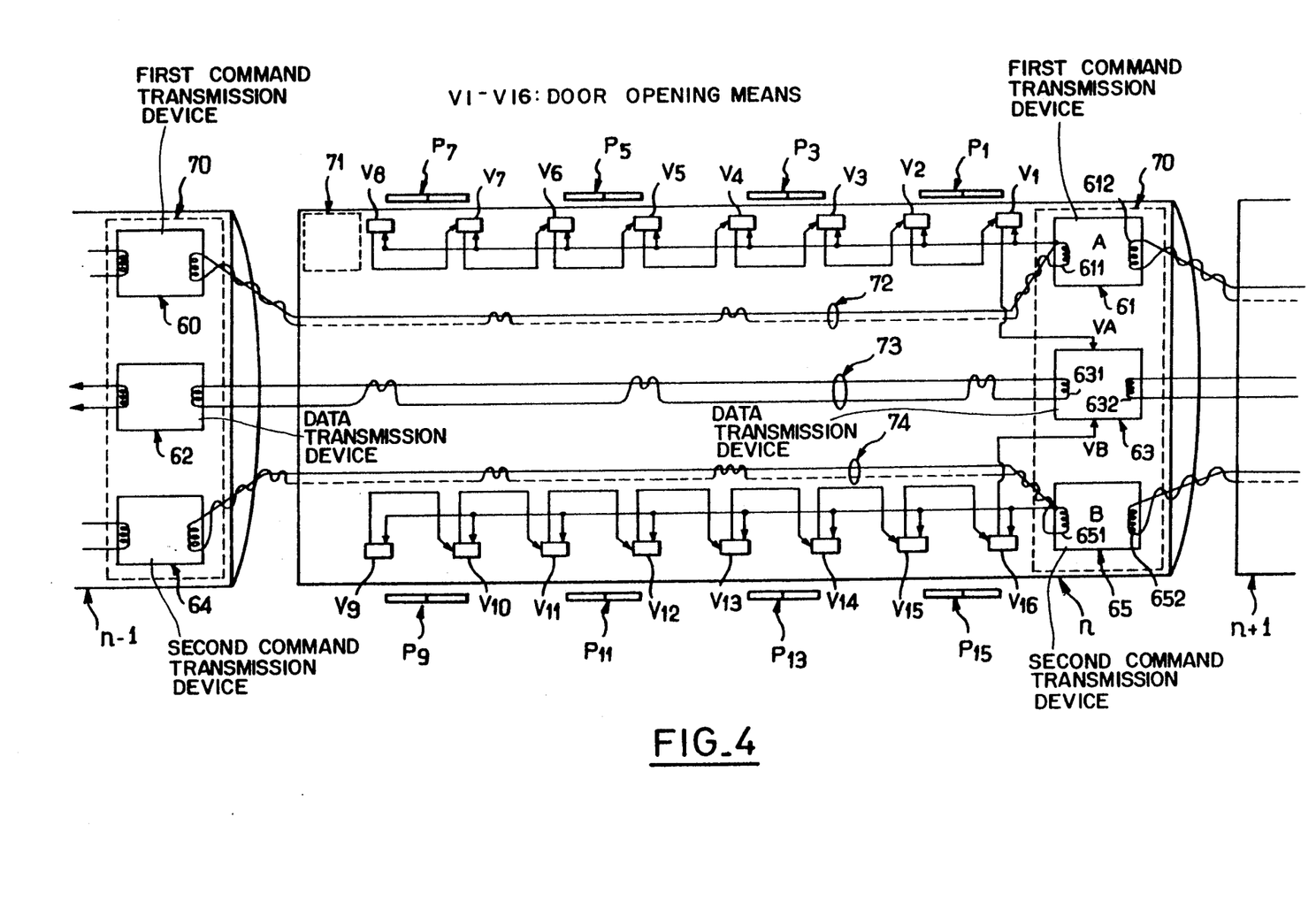
FIG. 4 is a block diagram of a system for the transmission of commands and data within a string of railroad cars, implementing several devices according to the invention and three pairs of lines.

By way of non-limitative example, a car n is considered which is part of a string comprising N cars among which there is a car n−1 and a car n with reference to FIG. 4. Assume that the decision center for the opening and closing of the doors of the string of cars concerned is situated in the driving controls of the first car 1 (not shown). The driver must, on the one hand, have a closing datum for all of the doors in the train before starting the latter and, on the other hand, must be able to transmit to all of the cars separate or joint commands for the opening of the doors located on the left and for the doors located on the right, from the arbitrary point of view of the driver of the train facing the normal direction of motion.

Thus, the door closing data must pass from car to car, from the last car towards the first car. During its passage through a given car n, the closing data is capable of being modified if the closing sensors of the car n indicate the non-closure of at least one door in that car.

Conversely, the door opening commands pass from the driving controls, located for example in the first car, towards the following cars, step by step, down to the last car N.

Thus, in a first embodiment of the system for the transmission of data or commands according to the invention, each car $1, \ldots, n-1, n, n+1, \ldots, N$ comprises three pairs of transmission lines 72, 74, 73.

A first pair of lines 72 is intended for the transmission of the commands for the opening of the doors on the right-hand side while a second pair of lines 74 is intended for the transmission of the commands for the opening of the doors on the left-hand side.

A third pair of lines 73 ensures the transmission of door closing data.

Each car $n$, $n-1$ furthermore comprises first and second command transmission devices 61, 65, 60, 64 having a structure similar to that of the device according to the invention shown in FIG. 4. The respective disposition and connections of the first and second devices 61, 62 being perfectly symmetrical, the description will be limited, for reasons of clarity, to the example of the first command transmission device 61.

In the example of car n shown diagrammatically in the figure, each side is respectively provided with four doors P1, P3, P5, P7; P9, P11, P13, P15 each composed of two leaves V1 to V16.

With each leaf there is associated, in a very diagrammatic way, a control and monitoring system, V1–V8, comprising an opening actuator and a closing sensor, all of the opening actuators being connected in parallel and all of the closing sensors being connected in series.

The command transmission device 61 is connected, on the one hand, by its first port 611, to a first end of the first pair of transmission lines 72, and on the other hand, by its second port 612, to a second end of a first pair of transmission lines providing the link between the car n and the immediately following car n+1. Furthermore, the first end of the first pair of lines 72 is also connected to the different opening actuators at the level of the first port 611.

Because of the use of the transmission device 61 according to the invention, the transmission is totally reversible, thus enabling the opening command to be relayed either from the first car towards the last car n or from the last car N towards the first car.

The description which has just been given also applies to the second command transmission device 65.

A third data transmission device 63, 62 similar to that shown in FIG. 2 is provided in order selectively to relay a door closing datum transmitted on the pair of lines 73.

This information, originally transmitted from the last car n, is relayed step by step and blocked as soon as, in a car n, the door closing sensors indicate that at least one leaf of the car n is open. The command transmission device 63 of which a first port 631 is connected to a first end of the third pair of lines 73 and a second port 632 is connected to a first end of a third pair of lines of the following car n+1, comprises two inputs, VA, VB, respectively connected to the first sequence of door closing sensors connected in series and to the second sequence of door closing sensors connected in series.

If it is assumed, by way of non-limitative example, that a logic 1 level corresponds to the closing of all of the leaves while a logic 0 level signifies that at least one of the leaves is not closed, it is necessary to have two logic levels 1, 1 present at the same time at the inputs VA and VB of the transmission device 63 in order that a logic 1 level present on the second port 632 can be relayed to the first port 631 and on the pair of lines 73. If at least one of the two inputs VA, VB exhibits a logic 0 level, the transmission device 63 blocks the closing datum coming from the car n+1.

In another embodiment of the transmissions or commands system according to the invention, two first and second pairs of transmission lines 93, 95 are provided instead of three in the first abovementioned embodiment. Each pair of lines transmits both the door opening commands and the door closing data, with reference to FIG. 5. A "phantom" line is thus produced which is balanced over the two pairs of opening command lines at the right and at the left. In the car n, the first pair of lines 93 is connected to a first port 31a of the first transmission device 31 whose second port 31b is connected to a first pair of lines of the next car n+1. Similarly, the second pair of lines 95 is connected to a first port 35a of the second transmission device 35 whose second port 35b is connected to another pair of lines of the next car n+1. The primary windings of the first ports 31a, 35a are respectively provided with primary mid-point terminals P1, P5, while the secondary windings of the second ports 31b, 35b are provided with secondary mid-point terminals 51, 55.

Figure 5:
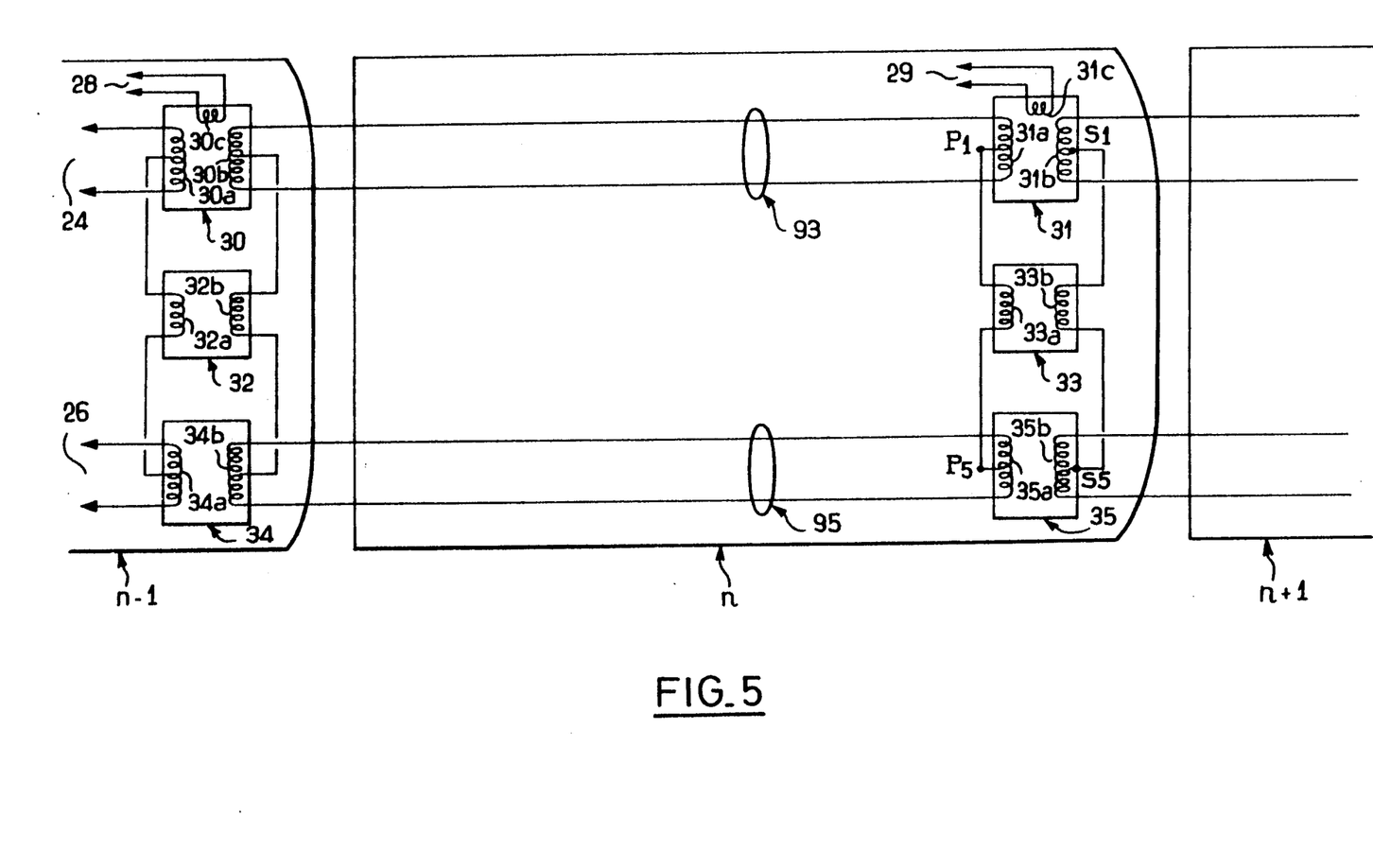
FIG. 5 is a block diagram of another system configuration using two pairs of lines.

The transmission system according to the invention furthermore comprises a third data transmission device 33 according to the invention and similar to that shown in FIG. 1, comprising a first port 33a of which one terminal is connected to the first primary mid-point P1 and the other is connected to the second primary mid-point P5, and a second port 33b of which one terminal is connected to the first secondary mid-point S1 and the other to the second secondary mid-point S2.

The adjacent cars are all equipped with similar transmission devices Thus, the transmission devices fitted to car n−1 are shown in FIG. 5.

The first and second command transmission devices 30, 34 of the car n−1 are respectively connected to the first and second command transmission devices 31, 35 of the car, the secondary windings 30b, 34b of the car n−1 being connected to the primary windings 31a, 35a.

All of the components fitted to the various means used in the transmission devices according to the invention must preferably be of the "intrinsic security" type, namely the components must have an internal structure such that in the case of a failure of any type they are not capable of supplying an incorrect datum or an untimely command.

The transmission devices according to the invention applied to strings of railroad cars provide a high level of safety for passengers: in effect, with these devices no untimely door opening command can be transmitted while the train is in motion, and no incorrect door closure datum can be transmitted at the time of starting the train.

The invention is of course not limited to the examples described and shown and numerous arrangements can be added to these examples without departing from the scope of the invention.

It is thus possible to envisage the application of the transmission devices according to the invention to other types of transport or to industrial applications where the relaying of data and commands with a high level of security is vital.

Furthermore, it is possible to use any known logic gate technology for producing devices according to the invention provided that it satisfies the intrinsic security conditions mentioned above.

Furthermore, the pairs of lines connecting the transmission devices according to the invention can be provided in practice in the form of coaxial cables or HF links.

I claim:

1. A method for the transmission of data or commands in alternating duplex mode between a first port (2) connected to a first pair of transmission lines and a second port (3) connected to a second pair of transmission lines, comprising:

A) a step of detecting and processing of data at the input of either of the ports, after a step of designating either port as the input port, the other port being designated as the output port, followed B) by a step of blocking any transmission of possible signals coming from the output port towards the input port, and C) by a step of transmitting the data from the input port to the output port after a step of detecting the data is carried out at the input of the input port, and in the opposite case followed:

D) by a step of blocking the transmission of all input signals to the output port, leading to step A) again, said data presented in any of the ports being in the form of an amplitude modulation of an alternating carrier signal having a predetermined carrier frequency, and the step A) of detecting and processing including a substep of identifying the predetermined carrier frequency and a substep of extracting from said data a useful logic signal representative of the data to be transmitted, wherein the steps A) to D) are selectively inhibited and replaced by the following steps:

E) a step of selecting one of the first and second ports, as output ports, followed F) by a step of transmitting a predetermined datum by the selected ports, selectively interrupted by external action on means (56, 57) for interrupting the transmitting step, and then followed G) by a step of blocking any transmission to the selected port or ports, leading to a new step E) if local control means are still actuated, or to the step A in the opposite case.

2. The transmission method as claimed in claim 1, further comprising the step of carrying out a predetermined logic test, wherein the execution of the steps E) and F) is furthermore conditioned by the satisfaction of the pre-determined logic test.

3. A device (1, 100) for the transmission of data (1) in an alternating duplex mode from a first port (2) to a second port (3), comprising:

means (4, 5) for detecting and processing data at the input of either of the ports (2, 3), means for designating either port as the input port, the other port being designated as the output port, means (12, 13) for selectively blocking any transmission of possible signals coming from the output port towards the input port, when the data are detected at the input port, said means (12, 13) being connected to the means for detecting and processing, means (8, 9) for selectively opening a predetermined transmission path from the input port to the output port, after the data are detected and processed at the input port, said means (8, 9) being connected to the means for blocking (12, 13), means (6, 7) for transmitting the data to the output port, said means (6, 7) being connected to the means for opening (8, 9) and to the output port, said means for detecting and processing including means for identifying a predetermined carrier frequency and means for extracting, from an alternating signal at the input of the input port, a useful modulation signal representative of the data to be transmitted, each of the ports being connected to a pair of transmission lines, wherein said device furthermore includes means (30) for controlling the transmission of data from the input port to the output port by the means for blocking (12, 13) and by the means for opening (8, 9) as a function of the state of at least one predetermined external variable applied as an input to the means for controlling (30).

4. The system for the transmission of data or commands in a railroad train constituted of several cars (n, n−1, n+1) using transmission devices (60, 65), as claimed in claim 3, in each car (n), comprising:

a first pair of transmission lines (72) for transmitting step by step a first opening command for a first group of doors (P1, P3, P5, P7), a second pair of transmission lines (74) for transmitting step by step a second opening command for a second group of doors (P9, P11, P13, P15), a third pair of transmission lines (73) for transmitting step by step door closing datum for doors of the several cars in the train in a predetermined direction with respect to each of the several cars, door opening means (V1-V16) connected with each door belonging respectively to the first and second groups of doors, a first and a second data command transmission device (61, 65) of which first ports (611, 651) are respectively connected, on the one hand, to a first end of the first pair (72) of transmission lines and to a first end of the second pair (74) of transmission lines, and, on the other hand, to the door opening means, and of which second ports (512, 652) are respectively connected to second ends of the first and second pairs of transmission lines of the adjacent car immediately next to each of the several cars, a third data command transmission device (63) of which a first port (631) is connected to a first end of the third (73) pair of transmission lines and of which a second port (632) is connected to a second end of the third pair of transmission lines of the adjacent car, there being external variables including a first variable (VA) indicative of a closing of the doors of the first group of doors and a second variable (VB) indicative of the a closing of the doors of the second group of doors, and a first and a second sequence of door closing sensor means, connected in series, for supplying the external variables to the third data command transmission device.

5. The transmission system as claimed in claim 4, wherein the transmission devices are located in a driving cab (70) of each car (n).

6. The system for the transmission of data in a railroad train constituted from several cars (n−1, n, n+1) using transmission devices, as claimed in claim 8, in each car (n), comprising:

a first pair of transmission lines (93) for transmitting step by step a first opening command for a first group of doors, a second pair of transmission lines (95), for transmitting step by step a second opening command for a second group of doors, a first (31) and a second (35) command transmission device, said first and second devices having primary transformer windings (31a, 35a) respectively provided with first and second secondary mid-points (S1, S5), said first ports of the first (31) and second (35) devices being respectively connected to first ends of the first (93) and second (95) pairs of lines, said second ports of the first (31) and second (35) devices being respectively connected to second ends of the first (93) and the second (95) pairs of transmission lines of the car (n+1) adjacent to a selected one of the several cars, a third transmission device (33) of which a first port has a first terminal connected to a first primary winding mid-point (P1) and a second terminal connected to a second primary winding mid-point (P5), and of which a second port has a first terminal connected o the first secondary mid-point (S1) and a second terminal connected to the second secondary mid-point (S5).

7. A device (1, 100) for the transmission of data (1) in alternating duplex mode from a first port (2) to a second port (3), said device having first and second groups of identical means for detecting data at the first port, respectively attached to the first and second ports (2, 3), said means for detecting data comprising:

first (4) and second (5) means for extracting a signal, first and second mean (12, 13) for selectively blocking data coming from the second port, first and second means (8, 9) for selectively opening a transmission path when the data are detected at the first port by the means for detecting data, said path being connected, on the one hand, respectively to the first and second means for extracting the signal and, on the other hand, respectively to the first and second means for selectively blocking (12, 13), first and second means (6, 7) for transmitting data coming from the second port, said means (6, 7) being connected on the one hand respectively to the first and second means for blocking (12, 13) and, on the other hand, respectively to the first and second ports (2, 3), first and second input logic inverting means, first (10) and second (11) output logic inverting means, said first (8) and second (9) means for selectively opening respectively including first and second logic opening gates having as first and second inputs, on the one hand, respectively an output logic signal coming from the first and second means for extracting the signal and, on the other hand, respectively, an output logic signal coming from the second and first logic opening gates respectively via the first and second input logic inverting means, wherein the first (12) and second (13) means for selectively blocking respectively include first (22) and second (23) logic blocking gates, each having a first and second inputs, on the one hand, the output logic signal coming respectively from the second and first logic opening gates, and, in the other hand, the output logic signal coming respectively from the first and second logic opening gates via the first and second output logic inverting means, and means for selectively supplying as output respectively a first logic information signal and a second logic information signal respectively applied to the first (6) and second (7) means for transmitting data.

8. A device (200) as claimed in claim 7, further comprising:

means for locally controlling data (400), respectively connected to the first (80) and second (90) means for selectively opening and to the first (88) and second (98) means for selectively blocking, first and second means for controlling a line of data (54, 55), said means (54, 55) being connected, on the one hand, respectively to the first (80) and second (90) means for selectively opening, synchronized with the means (400) for locally controlling data, first and second means (42, 43) for selecting either the first port or the second port, said means (42, 43) being connected on the one hand to the means (400) for locally controlling data and, on the other hand, respectively to the first (88) and second (98) means for selectively blocking and to the first (80) and second (90) means for selectively opening, and first (56) and second (57) means for interrupting a flow of data, said means (56, 57) being connected, on the one hand, respectively to the first (54) and second (55) means for controlling the line of data and, on the other hand, to the first (88) and second (98) means for selectively blocking, wherein the first (80) and second (90) means for selectively opening furthermore include respectively a first (52) and a second (53) logic control gate, each having a first control input respectively connected to the first (54) and second (55) means for controlling the line of data and respectively to the first (56) and second (57) means for interrupting the flow of data, a second control input respectively connected to an output of the second (9) and first (8) logic opening gates, a third control input respectively connected to the first (42) and second (43) means for selecting either port, and an output respectively connected to the inputs of the first and second input logic inverting means, wherein the first (88) and second (98) means for selectively blocking furthermore include respectively a first (50) and a second (51) logic selection gate, each having:

a first selection input, respectively connected to the second control input, of the first (52) and second (53) logic control gates, a second selection input, respectively connected to the first (56) and second (57) means for interrupting the flow of data, a third selection input connected to the third control input, and an output respectively connected to the first inputs of the first (48) and second (49) logic blocking gates.

9. The device (200) as claimed in claim 8, wherein the first (54) and second (55) means for controlling the line of data are respectively constituted by first and second line control switches, operating in synchronism, each having four poles and two possible states, a first state corresponding to a short circuiting of a first (541, 551) and a second (542, 552) pole, the other two poles not being connected electrically, a second state corresponding to a short circuiting of a third (543, 553) and a fourth (544, 554) poles, said first and second poles not being electrically connected, wherein the first poles (541, 551) of the first and second line control switches are respectively connected to the first (4) and second (5) means for extracting the signal, wherein the second poles (542, 552) of the first and second line control switches are respectively connected to the first inputs of the first (8) and second (9) logic opening gates, wherein the third poles (543, 553) of the first and second line control switches are respectively connected to the first poles (541, 551), wherein the fourth poles (544, 554) of the first and second line control switches are respectively connected to a first terminal (561, 571) of the first (56) and second (57) means for interrupting the flow of data and to the first inputs of the first (52) and second (53) logic control gates.

10. The device (200) as claimed in claim 8, wherein the first and second means for selecting either port respectively include first and second selection switches having four poles and also having two possible switching states, a first state corresponding on the one hand to electrical contact between a first (421, 431) and a second (422, 432) pole and on the other hand to electrical contact between a third (423, 433) and a fourth (424, 434) pole, a second state corresponding to absence of electrical contact, on the one hand, between the first (421, 431) and second (422, 432) poles and, on the other hand, between the third (423, 433) and fourth (424, 434) poles, and wherein the first poles (421, 431) of the first (42) and second (43) selection switches are respectively connected to the first and second means (46, 47) for transmitting data, wherein the second poles (422, 432) are respectively connected to each other and to a first terminal (401) of the means (400) for locally controlling data, wherein the third poles (423, 433) are respectively connected to the third inputs of the first (50) and second (51) logic selection gates, wherein the fourth poles (424, 434) are respectively connected to each other and to a second terminal (402) of the means (400) for locally controlling data.

11. The device (200) as claimed in claim 10, wherein the means (400) for locally controlling data furthermore comprises:

a bipolar displacement switch (40), indicating a logic state of a predetermined external sensor, of which a first pole is connected to a first predetermined d.c. voltage source (+V), a first bipolar local control switch (41) of which a first pole is connected to a second pole of the bipolar displacement switch (40), and of which a second pole is connected to the second terminal (402) of the means for locally controlling data, a second bipolar local control switch (44) of which a first pole is connected to the first terminal (401) of the means for locally controlling data and of which a second pole is connected to a second predetermined source of d.c. voltage (−V), said first and second local control switches (41, 44) operating in synchronism with an operation of the first and second line control switches.

12. The device (200) as claimed in claim 8, wherein the first (52) and second (53) logic control gates and the first (50) and second (51) logic selection gates are logic OR gates.

13. The device as claimed in claim 7, wherein the first (8) and second (9) opening logic gates and the first (12) and second (13) logic blocking gates are logic AND operators.

14. The device (100) as claimed in claim 7, further comprising means for controlling (30) transmission of data, said means (30) including logic operator means of control having as input external variables, and also having an output, said output of the logic operator means of control being connected to a third input of the first (22) and second (23) logic blocking gates.

* * * * *